United States Patent [19]

Efstratis

[11] Patent Number: 4,481,871
[45] Date of Patent: Nov. 13, 1984

[54] VENTILATOR EXTENSION UNIT

[76] Inventor: Ernest Efstratis, 6775 Wing Lake Rd., Birmingham, Mich. 48010

[21] Appl. No.: 402,958

[22] Filed: Jul. 29, 1982

[51] Int. Cl.³ .............................................. F24F 13/06
[52] U.S. Cl. ..................................... 98/40 C; 403/363
[58] Field of Search ........................ 98/40 C, 101, 103; 403/363; 138/120, 155; 193/6, 25 A, 25 C, 30

[56] References Cited

U.S. PATENT DOCUMENTS

| 1,094,508 | 4/1914 | Wilford | 193/30 X |
| 1,400,658 | 12/1921 | Brown | 193/30 |
| 4,020,753 | 5/1977 | Efstratis | 98/40 C |

FOREIGN PATENT DOCUMENTS

| 424166 | 1/1926 | Fed. Rep. of Germany | 193/30 |
| 38118 | 1/1915 | Sweden | 193/30 |

Primary Examiner—Harold Joyce
Attorney, Agent, or Firm—Barnes, Kisselle, Raisch, Choate, Whittemore & Hulbert

[57] ABSTRACT

A portable air duct extension unit especially for use in a building heated or cooled by air and having a hot or cold air outlet. The unit comprises telescoping mounting and extension sections with magnets for mounting the unit. The sections may be formed by extrusion and are designed to maximize the flow of air without turbulence.

5 Claims, 4 Drawing Figures

U.S. Patent   Nov. 13, 1984   4,481,871
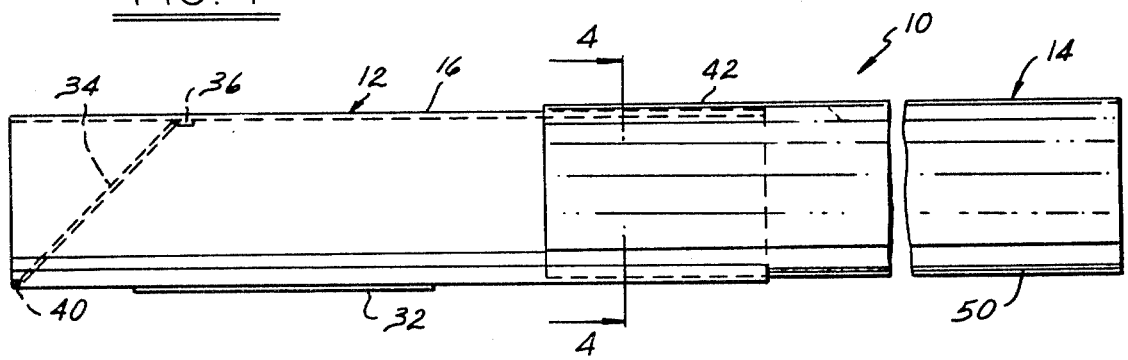
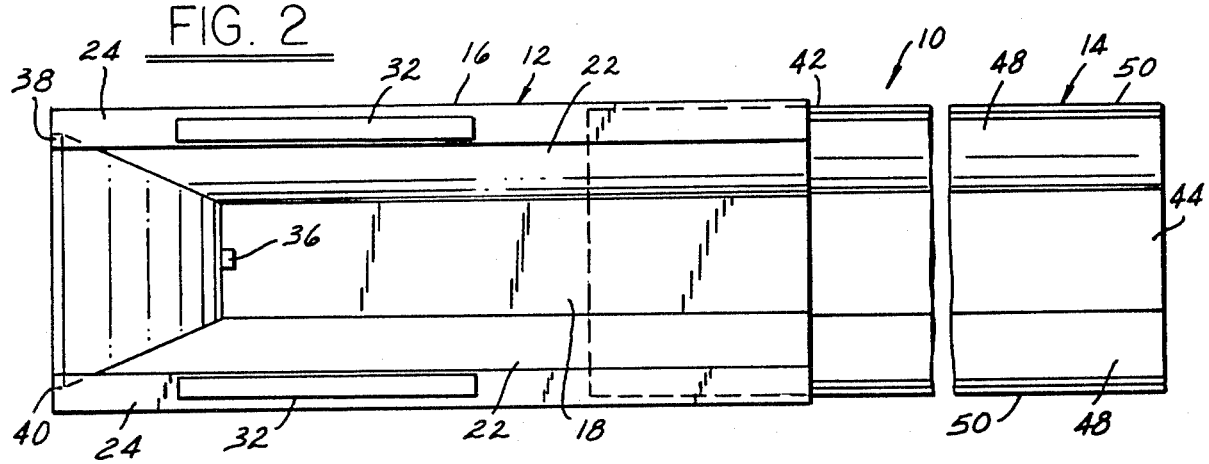
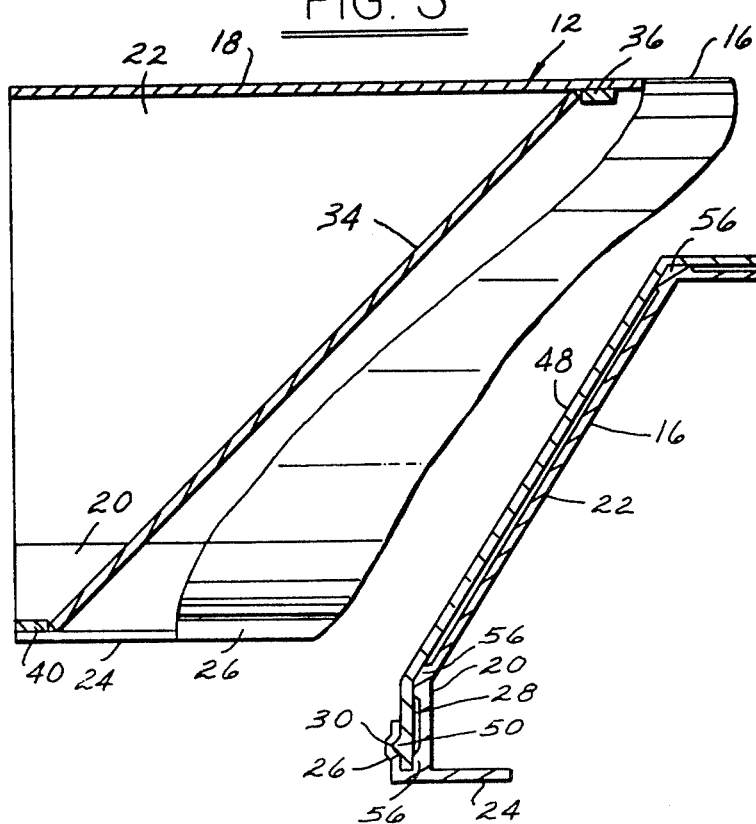
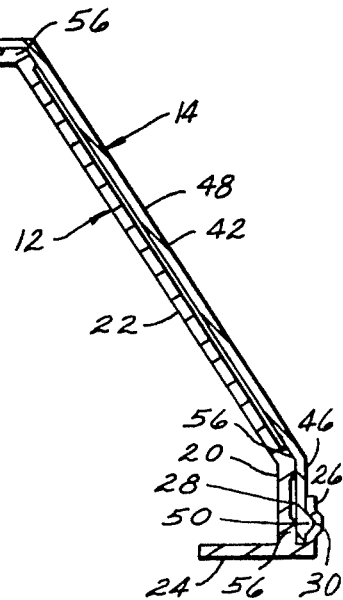

VENTILATOR EXTENSION UNIT

This invention relates generally to ventilation extension units and refers more particularly to a portable air duct adapted to re-direct or re-route air discharged from a hot or cold register in a building.

BACKGROUND AND SUMMARY OF THE INVENTION

Often a hot or cold air register is blocked by a piece of furniture. In such instances, the discharge of hot or cold air into the room is obstructed and the temperature balance in the room is upset. The ventilation extension unit of this invention provides a portable air duct for re-routing the air around the obstruction. This is accomplished without materially affecting the free flow of air.

The extension unit of this invention is less expensive yet superior to any similar unit on the market of which I am aware, including that described in my own prior U.S. Pat. No. 4,020,753.

My improved unit is made of telescoping sections which are dimensioned and formed to re-route the air with little or no turbulence.

Moreoever, the sections comprise members formed as channel-shaped extrusions capable of being produced at minimum cost. Either one of the extrusions may, if desired, be provided with a snap-in baffle, the purpose of which is to close one end of the unit. The telescoping sections are slidably adjusted to vary the length of the unit, and means are provided to reduce the friction between the telescoping sections when making an adjustment. The walls of the channel-shaped extrusions are formed so that the flow of air is maximized across the front wall of the unit. The unit is designed to fit snuggly against the building wall so the unit itself does not require a back wall.

These and other objects of the invention will become more apparent as the following description proceeds, especially when considered with the accompanying drawings.

BRIEF DESCRIPTION OF THE DRAWINGS

FIG. 1 is a side elevational view of a portable air duct extension unit constructed in accordance with my invention.

FIG. 2 is a bottom plan view of the unit shown in FIG. 1.

FIG. 3 is an enlarged elevational view of the left hand portion of FIG. 1 with parts broken away and in section.

FIG. 4 is a sectional view taken along the line 4—4 in FIG. 1.

DETAILED DESCRIPTION

Referring now more particularly to the drawings, the portable air duct extension unit 10 is composed of telescoping sections 12 and 14.

The section 12, sometimes referred to as a mounting section, comprises an elongated channel-shaped member 16 which may be formed by extrusion. The member or extrusion 16 is of uniform cross-section throughout its length. It has a flat front wall 18, laterally spaced, parallel, flat side walls 20, and inclined flat walls 22 connecting the front and side walls. The ends of the extrusion are open and square-cut. The parallel side walls 20 are disposed at right angles to the front wall 18. There are flanges 24 at the free edges of the side walls which extend toward one another in a common plane parallel to the front wall 18. The space between the confronting edges of the flanges 24 at the rear of the extrusion is open for the full length thereof.

The flanges 24 extend laterally outwardly beyond the side walls 20, having terminal portions 26 disposed in spaced parallel relation to the side walls 20 to form slots 28. These terminal portions 26 are of the configuration shown in FIG. 4, having grooves 30 extending lengthwise of the mounting section 12 from end to end thereof.

Magnets 32 are secured by any suitable means to the rear surfaces of the flanges 24, serving as a means to mount the unit 10 on the hot or cold register over the air outlet in the wall of a building. The magnets are in the form of flat strips enabling the unit 10 to hug the building wall closely so that air cannot escape along the flanges 24.

A baffle or closure plate 34 is installed at an angle in the extrusion 16 to close one end thereof. The closure plate is retained by abutments 36, 38 and 40 respectively secured to the inner surfaces of the front wall 18 and flanges 24. The closure plate is of a suitable flexible material and may be snapped into assembly. It may be just as easily removed by flexing to clear the abutments. The extrusion 16 is open at the end opposite the closure plate. Both ends are shown as square-cut, but the end having a baffle plate may, if desired, be trimmed on an angle corresponding to that of the closure plate for the sake of appearance.

The section 14, sometimes referred to as an extension section, comprises an elongated channel-shaped member 42 which may be formed by extrusion. The member or extrusion 42 is of uniform cross-section throughout its length. It has a flat front wall 44, laterally spaced, parallel, flat side walls 46, and inclined, flat walls 48 connecting the front and side walls. The parallel side walls are at right angles to the front wall 44. The ends of the extrusion 42 are open and square-cut, and the space at the rear between the free edges of the side walls is open. The configuration of the front, side and inclined walls of the extrusion 42 is substantially the same as the configuration of the corresponding portions of the extrusion 16, although somewhat larger so that the extrusion 16 can be nested or telescoped within the extrusion 42 in the relationship shown in FIG. 4 with the side walls 46 slidably disposed in the slots 28.

It will be noted that the side walls 46 of the extrusion 42 have ribs 50 extending lengthwise from end to end thereof, slidably disposed within the grooves 30 to prevent accidental disassembly of the parts.

It will also be noted that the extrusion 16 has slide rails 56 at the angles between the front, side and inclined walls and also where the side walls connect to the flanges 24. These slide rails extend lengthwise of the extrusion 16 from end to end thereof and provide points of sliding contact with the extrusion 42, reducing friction when the extension section is moved to an adjusted position.

The shape of the extrusions 16 and 42 may vary, but preferably the angle between the front wall and inclined walls is approximately 120° and the angle between the side walls and inclined walls is approximately 150°. Also the angle of the closure to the front wall of extrusion 16 is approximately 45°. As a result, the flow of air is concentrated along the front walls of the extrusions away from the building wall. This is one of the reasons the rear side of the unit nearest the building wall may be open.

In use, the magnets 32 hold the mounting section 12 on the hot or cold register over the air outlet in a building and the extension section is slid longitudinally to the extent desired. Air coming from the register is deflected by the closure plate 34 and the inclined walls to move along the front walls of the sections to the outlet at the right end of the extension section in FIGS. 1 and 2. Both sections are close to the building wall and thus prevent air from escaping before reaching the outlet. Accordingly, the rear of the extrusions may be open.

The ventilation extension unit is especially designed to enable it to extend either left or right from the wall register. This is permitted by the equal slope of the inclined flat walls. These walls are preferably set at an optimum angle to act as baffles to deflect the forced air flow at maximum velocity.

I claim:

1. A portable air duct extension unit especially for use in a building heated or cooled by forced air and having a hot or cold air outlet, comprising a mounting section and an extension section, each section comprising an elongated channel-shaped extrusion of uniform cross-section throughout its length having a front wall and laterally spaced side walls, each extrusion being open at both ends and open from end to end along the rear thereof between said side walls, said extrusions being slidably telescoped together to permit the length of said unit to be varied, means for removably mounting said mounting section over an air outlet in the wall of a building with the rear thereof disposed close to said wall, a closure plate secured to the end of the extrusion of said mounting section opposite the telescoped end thereof, one of said extrusions having slots receiving the side walls of the other extrusion, and rib and groove means for slidably retaining the side walls of said other extrusion in said slots.

2. A portable air duct extension unit especially for use in a building heated or cooled by forced air and having a hot or cold air outlet, comprising a mounting section and an extension section each being of uniform channel-shaped cross-section throughout its length and having a front wall and laterally spaced side walls, each section being open from end to end along the rear thereof between said side walls, said sections being slidably telescoped together to permit the length of said unit to be varied, said extension section being open at both ends and said mounting section being open at the telescoped end but closed at the other end, means for removably mounting said mounting section over an air outlet in the wall or a building with the rear thereof disposed close to said wall, one of said sections having slots receiving the side walls of the other section, and rib and groove means for slidably retaining the side walls of the said other section in said slots.

3. An air duct extension unit as defined in claim 2, wherein said mounting section is closed at said other end by a removable closure plate.

4. An air duct extension unit as defined in claim 2, wherein one of said sections has means for reducing the sliding friction between said extensions when said extensions are adjusted longitudinally.

5. An air duct extension unit as defined in claim 2, wherein each extension has inclined walls between said front and side walls, the angle between said front and inclined walls being approximately 120°, the angle between said side and inclined walls being approximately 150°, and wherein said mounting section is closed at said other end by a closure plate set at an angle of approximately 45° to the front wall thereof.

* * * * *